United States Patent [19]

Braun et al.

[11] 3,852,658

[45] Dec. 3, 1974

[54] BISTABLE, SELF-COMPENSATING TRANSDUCER CIRCUIT

[75] Inventors: Roland J. Braun; Frederick Buckley, both of Vestal, N.Y.

[73] Assignee: International Business Machines Corporation, Armonk, N.Y.

[22] Filed: Dec. 26, 1973

[21] Appl. No.: 428,544

[52] U.S. Cl. .................... 323/16, 323/21, 323/94 H, 330/6, 330/59

[51] Int. Cl. .......................................... G05d 27/02

[58] Field of Search ...... 307/278, 309, 311; 323/16, 323/19, 21, 94 H, 100; 328/2; 330/6, 59, 85, 98

[56] References Cited

UNITED STATES PATENTS

| | | | |
|---|---|---|---|
| 3,331,012 | 7/1967 | Aiken | 323/21 |
| 3,359,483 | 12/1967 | Biard | 323/21 |
| 3,388,318 | 6/1968 | O'Brien | 323/94 H |
| 3,699,468 | 10/1972 | Harmgardt | 330/59 X |

*Primary Examiner*—A. D. Pellinen
*Attorney, Agent, or Firm*—Gerald R. Gugger

[57] ABSTRACT

A DC coupled bistable, self-compensating transducer circuit which is capable of extracting positive or negative signals under extreme bias conditions. The circuit comprises a first differential amplifier for amplifying the input signal, a second differential amplifier connected in a compensation loop for providing negative feedback to the input signal source, and a third differential amplifier which acts as a bi-directional threshold detector with built-in trigger action and hysteresis overlap.

7 Claims, 3 Drawing Figures

BISTABLE, SELF-COMPENSATING TRANSDUCER CIRCUIT

BACKGROUND OF THE INVENTION

Many transducer applications call for sensing of a relatively small signal which is superimposed on an undetermined or changing bias larger than the signal amplitude. This large bias range may be due to component tolerances such as, for example, electro-optical efficiency of light emitting diodes and photosensors, Hall generator offset voltage, permanent magnet field, etc. It may also be due to physical variables such as magnetic flux paths, distance, optical alignment, dust, color, and it may be influenced by temperature, supply voltage changes, aging, etc. The signal may be a step or pulse, with a repetition rate from dc to several hundred KHz and a rise and fall time of up to a few milliseconds. The logic level output of the sense circuit must conform to the repetition rate frequency and indicate at all times whether the last transition was up or down.

Heretofore, the changing bias has been compensated for by manually adjusting the circuit, which proved to be a tedious approach, or by providing a rather complex servo circuit which is ac coupled to the input signal source. Capacitors at the input are often undesirable because they are difficult to implement on integrated circuit chips and, therefore, require normally discrete components with terminal pads, wires, and associated high frequency noise exposure.

SUMMARY OF THE INVENTION

The bistable, self-compensating transducer circuit of the present invention achieves complete function with three relatively simple differential amplifiers for easy integration and it is dc coupled to the input signal source. For purposes of illustration, the input signal source is shown as a photosensor and as a Hall generator.

In an optical transducer application, a light emitting diode is the signal source for a photosensor and current from the photosensor flows through a resistor to produce a voltage drop. This voltage drop is applied to an input differential amplifier which produces an amplified inverted signal. The inverted signal is in turn applied to a switching differential amplifier and to a control-signal differential amplifier. The switching amplifier is connected to a fixed reference voltage. If the inverted signal is greater than the reference voltage, the output of the switching amplifier will be at its "up" level and if it is less than the reference voltage, the output will be at its "down" level. The control-signal amplifier is also connected to the fixed reference voltage by way of a resistor and is further connected by way of another resistor to the output of the switching amplifier. The control-signal amplifier is thus referenced to a variable voltage which is dependent on the output level of the switching amplifier, the fixed reference voltage and the values of the resistors.

The control-signal amplifier will amplify the difference between the inverted input signal and the variable reference voltage and will supply a proportional output current to the light emitting diode. The change of this current will be relatively slow compared with the rate of change of the other signals in the circuit due to a capacitor. Since the light emitting diode is the signal source for the photosensor, there is provided a closed loop, negative feedback, regulating system, highly damped by a capacitor, and which will always strive toward an equilibrium condition.

The circuit operates in the same fashion for a Hall generator input signal source. The Hall voltage electrodes are connected to the input differential amplifier and the output current of the control-signal differential amplifier is fed back to a compensating electrode on the Hall generator.

The present circuit contains several functional features which result in improved circuit operation: (1) It is a dc coupled circuit with automatic low frequency noise compensation via continuously adjusted bias condition. (2) There is a bipolar threshold with positive and negative threshold which is selectable over a large range and for equal or different values. (3) Amplitude of total low frequency noise may be much larger than signal amplitude. (4) High threshold accuracy which is independent of input stage offset voltage.

It is, then, a primary object of the present invention to provide a novel and improved bistable, self-compensating transducer circuit.

A further object of the present invention is to provide a novel and improved bistable, self-compensating transducer circuit which is dc coupled to an input signal source.

A still further object of the present invention is to provide a novel and improved dc coupled transducer circuit which is capable of extracting positive or negative signals under extreme bias conditions.

A further object of the present invention is to provide a novel and improved dc coupled transducer circuit which is capable of extracting positive or negative signals under extreme bias conditions and which achieves complete function with three relatively simple differential amplifiers.

The foregoing and other objects, features and advantages of the invention will be apparent from the following more particular description of a preferred embodiment of the invention as illustrated in the accompanying drawings.

DESCRIPTION OF PREFERRED EMBODIMENT

Figure 1:
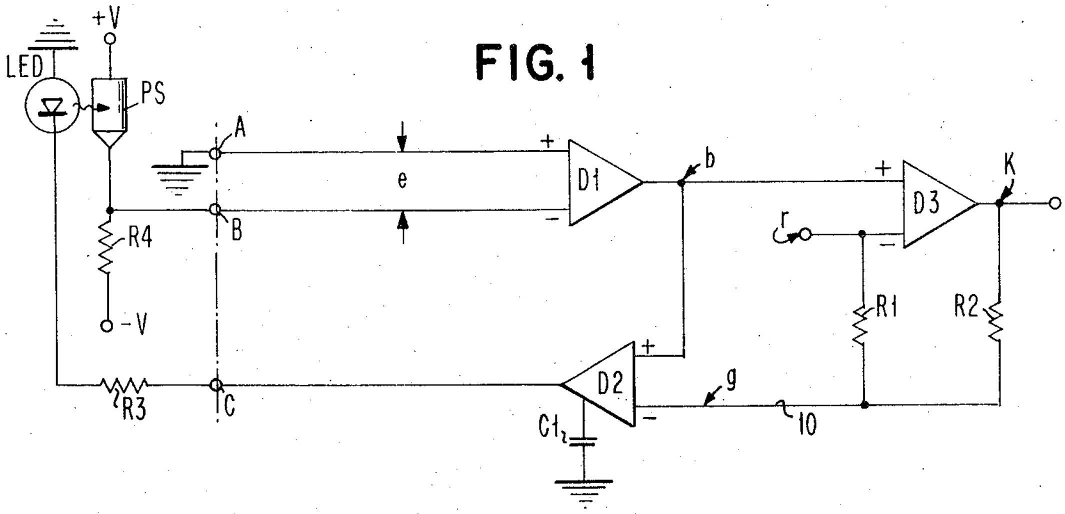
FIG. 1 is a schematic diagram of the transducer circuit of the present invention connected to a photosensor signal source.

Referring to FIG. 1, the bistable, self-compensating circuit comprises basically three differential amplifiers D1, D2 and D3. D1 may be a conventional two transistor differential amplifier input stage having its positive side connected to an input terminal A and its negative side connected to an input terminal B. The output of amplifier D1 is connected to the positive input side of differential amplifier D2 and also to the positive input side of differential amplifier D3. The negative input side of amplifier D3 is connected to a source of reference voltage *r*. Amplifier D3 functions as a switching amplifier and may, for example, comprise a conventional two transistor differential amplifier input stage followed by a PNP level inverter with a normal open collector driver stage. The output of amplifier D3 is taken by way of a resistor R2 and line 10 to the negative input side of amplifier D2. In response to an input signal e from a signal source, amplifier D1 will produce an amplified, inverted output signal *b* and if the output signal *b* is greater than the reference voltage *r*, the output signal K of amplifier D3 will be at its "up" level and if signal *b* is less than the reference voltage *r* then output signal K will be at its "down" level.

The negative input side of amplifier D2 is also connected by way of a resistor R1 to the reference voltage *r* and amplifier D2 is referenced to a voltage *g* on line 10 which is dependent on the output level K of amplifier D3, the reference voltage *r* and the values of resistors R1 and R2. For example, assuming voltage $r = 0$ volts, $R1 = 0.11R2$, and $K = 5$ volts (up level), then, reference voltage $g = 0.5$ volts and when $K = -5$ volts (down level), $g = -0.5$ volts.

Amplifier D2 functions as a control signal amplifier and may comprise a conventional two transistor differential amplifier input stage followed by a three stage Darlington output driver. Amplifier D2 will amplify the voltage difference $b-g$ and supply a proportional output current to output terminal C and, as will be described, this current is fed back to the input signal source to compensate for changing bias conditions. The rate of change of this current will be relatively slow compared with the rate of change of the other signals *e*, *b* and K due to a damping capacitor C1 connected between amplifier D2 and ground.

In FIG. 1, the input signal source is shown as an optical transducer. The optical transducer comprises a light emitting diode LED having its anode connected to ground and its cathode connected by way of a limiting resistor R3 to the output terminal C of amplifier D2. The diode LED is the signal source for a photosensor PS which has its collector connected to a +V voltage source and its emitter connected by way of a resistor R4 to a −V voltage source. The photosensor emitter output is connected to the input terminal B of amplifier D1 and the other input terminal A is connected to ground.

In a document detection application, assume that initially there is no obstruction between the diode LED and the photosensor PS with the output K of amplifier D3 in its "down" level and the signal voltage *b* close to the reference voltage level *g*. As a document moves between the diode LED and the photosensor PS, the light input to the photosensor is reduced by a certain amount depending on the transparency of the document. The input voltage *e* to amplifier D1 drops causing an equivalent amplified rise in signal *b*. This rise in signal voltage *b* will cause amplifier D3 to switch its output to the "up" level, which in turn will cause the reference voltage level *g* to assume its "up" level value of, for example, +0.5 volts. If signal *b*, at this point in time, is larger than signal *g*, amplifier D2 will increase its current into the light emitting diode LED causing signal *e* to rise and signal level *b* to decrease. The opposite happens if signal *b* is less than signal *g*. As a result, the current to the diode LED will be automatically adjusted to a value which causes signal levels e and b to attain again an equilibrium value in relation to the new reference voltage *g*. Since signals *g* and *b* are now larger than reference voltage *r* by, for example, 0.5 volts, signal K will stay in its "up" level until signal *b* drops below reference level *r* (i.e., until a negative signal *b* of at least *b-r*, for example, −0.5 volts, is produced). Such a drop in signal level *b* will occur when the document is removed from between the diode LED and the photosensor PS. Signals K and *g* will then switch back to their "down" level states and signal levels *e* and *b* will be regulated back to their initial values.

If dust builds up between diode LED and photosensor PS, signals *e* and *b* will also change. But this change will occur gradually and will be relatively small since it will be compensatd continuously by adjusting the diode LED current through the servo loop of amplifier D2. As was previously mentioned, to prevent a compensation for regular signal transitions, which are much faster than environmental changes such as dust, temperature, etc., the amplifier D2 feedback servo loop is highly damped with capacitor C1 allowing only a relatively slow change in the diode LED current.

If, in the case of a document detection application, an opaque document blocks all light, signal *e* will drop to its minimum level, signal *b* will rise to its maximum level and a maximum current will eventually flow through the diode LED light source, limited by the resistor R3. Though under this condition the system is out of its active regulation range, proper function is assured by the fact that when the opaque document is removed, more than enough light will reach the photosensor PS again to provide active regulation. In the meantime, the output signal K is maintained at its proper level.

Since the diode LED is the signal source for photosensor PS, there is provided a closed loop, negative feedback regulating system, highly damped by capacitor C1, which will always strive toward an equilibrium condition. Negative feedback implies, according to the standard usage in the field of electronic circuitry, that the feedback signal causes the primary input signal, i.e., the ac content or voltage change of the input voltage *e*, to be greatly reduced in a linear correlation to the output signal. This is achieved by feeding part of the amplified input signal (feedback signal) back to the input or signal source in phase opposition to the primary signal.

In some cases where the photosensor PS provides enough amplification of the signal it may not be necessary to use the input amplifier D1. For such a case, the circuit shown in FIG. 1 would be modified by removing the amplifier D1, reversing the light emitting diode LED so its cathode is connected to ground and its anode connected to resistor R3, and connecting the photosensor PS emitter output directly to the positive input sides of amplifiers D2 and D3.

Figure 2:
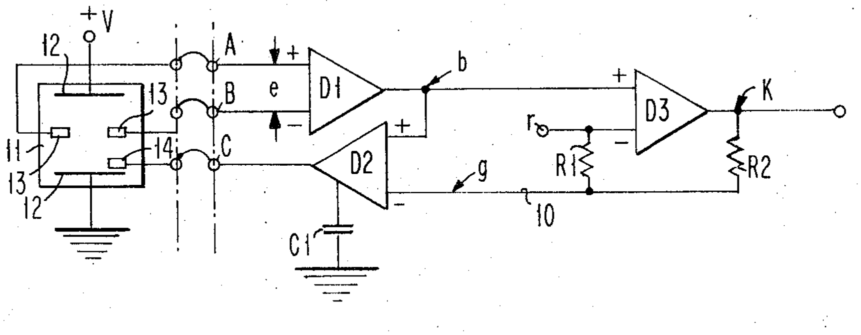
FIG. 2 is a schematic diagram of the transducer circuit of the present invention connected to a Hall generator signal source.

In FIG. 2 there is shown the basic circuit of FIG. 1 with a magnetic transducer as an input signal source. The magnetic transducer comprises a Hall generator 11 having its current electrodes 12 connected between ground and *a* +V voltage source. The Hall voltage electrodes 13 are connected to the input terminals A and B of amplifier D1 and a compensating or control electrode 14 is connected to the output terminal C of amplifier D2. Due to the low output signals from the Hall generator, D1 may take the form of a two stage differential amplifier. The circuit operates in the same fashion as described above to compensate for any Hall generator offset voltage.

Figure 3:
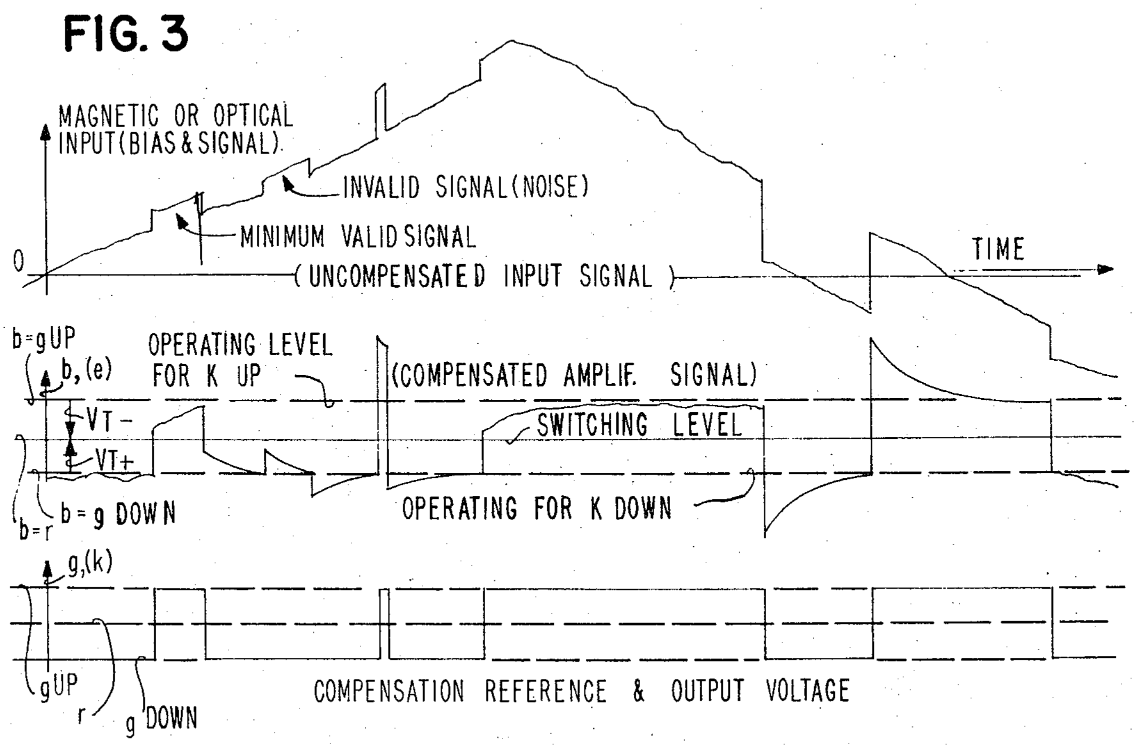
FIG. 3 is a waveform diagram showing performance characteristics of the circuit of FIGS. 1 and 2.

FIG. 3 shows signal traces for voltages *e*, *b*, *g* and K in response to an input shown in the top line. Voltages *e* and K are equivalent to *b* and *g*, respectively, with an appropriate vertical scale factor. The input signal shown may be from either a magnetic or an optical transducer source and there is illustrated the minimum valid signal which will effect switching and an invalid signal, such as noise, which will effect switching. The signal traces in the second and third lines illustrates how the circuit correctly responds to regular signals having a fast rise time while compensating for drifting effects or slowly changing bias conditions. Voltages *b* and *e* in the second line always tend toward one of two operating levels depending on the status of the output voltage K. The time it takes to reach the steady state level after a signal transistor depends on the time constant of the compensation loop.

While the invention has been particularly shown and described with reference to a preferred embodiment thereof, it will be understood by those skilled in the art that various changes in form and details may be made therein without departing from the spirit and scope of the invention.

What is claimed is:

1. A transducer circuit dc coupled to a signal source for sensing signal transitions superimposed on an undetermined or changing bias which may be larger than the signal amplitude which comprises:

an input differential amplifier having its input connected directly to said signal source;

a switching differential amplifier having a first input connected to the output of said input amplifier;

a source of reference voltage connected to a second input of said switching amplifier;

a control signal differential amplifier having a first input connected to the output of said input amplifier;

means connecting a second input of said control signal amplifier to the output of said switching amplifier;

means connecting said second input of the control signal amplifier to said reference voltage source;

feedback connecting means from the output of said control signal amplifier to said signal source; and means associated with said control signal amplifier for filtering out high speed signal transitions.

2. A transducer circuit dc coupled to a signal source for sensing relatively fast positive or negative signal transitions superimposed on an undetermined slow changing bias larger than the signal amplitude which comprises:

an input differential amplifier having its input connected directly to said signal source;

a switching differential amplifier having a first input connected to the output of said input amplifier;

a source of reference voltage connected to a second input of said switching amplifier;

a control signal differential amplifier having a first input connected to the output of said input amplifier;

means connecting a second input of said control signal amplifier to the output of said switching amplifier;

means connecting said second input of the control signal amplifier to said reference voltage source;

means connecting the output of said control signal amplifier to said signal source; and a damping capacitor connected to said control signal amplifier to filter out the fast signal transitions; said control signal amplifier providing negative feedback to said signal source to compensate for changing bias conditions and said switching amplifier providing output signals in response to the fast signal transitions from said signal source.

3. A transducer circuit as set forth in claim 2 wherein said signal source is an optical transducer comprising:

a photosensor having its output connected directly to the input of said input amplifier; and a light emitting diode signal source for said photosensor, said diode being connected to the output of said control signal amplifier.

4. A transducer circuit as set forth in claim 2 wherein said signal source is a magnetic transducer comprising:

a Hall generator having its voltage electrodes connected directly to the input of said amplifier; and a control electrode on said Hall generator which is connected to the output of said control signal amplifier.

5. A bistable, self-compensating transducer circuit dc coupled to a signal source for sensing signal transitions superimposed on an undetermined or changing bias larger than the signal amplitude which comprises:

an input differential amplifier having its input connected directly to said signal source;

a switching differential amplifier having a first input connected to the output of said input amplifier;

a source of fixed reference voltage connected to a second input of said switching amplifier for establishing a threshold whereby the output of the switching amplifier assumes either an "up" level or a "down" level dependent on the relationship between the output of the input amplifier and said fixed reference voltage;

a control signal differential amplifier having a first input connected to the output of said input amplifier;

means connecting a second input of said control signal amplifier to said fixed reference voltage source;

means connecting said second input of the control signal amplifier to the output of said switching amplifier whereby a variable reference voltage is established at said second input which is dependent on the output of said switching amplifier; and feedback connecting means from the output of said control signal amplifier to said signal source, said control signal amplifier providing said signal source with current which varies in accordance with the relationship between the output of said amplifier and said variable reference voltage.

6. A bistable, self-compensating transducer circuit as set forth in claim 5 and including a damping capacitor connected to said control signal amplifier whereby only relatively slow changes in current are fed back to said signal source.

7. A bistable, self-compensating transducer circuit for sensing signal transitions superimposed on an undetermined or changing bias larger than the signal amplitude which comprises:

a photosensor;

a light emitting diode signal source for said photosensor;

a switching differential amplifier having a first input connected to the output of said photosensor;

a source of reference voltage connected to a second input of said switching amplifier;

a control signal differential amplifier having a first input connected to the output of said photosensor;

means connecting said reference voltage source to a second input of said control signal amplifier;

means connecting the output of said switching amplifier to said second input of the control signal amplifier;

feedback connecting means from the output of said control signal amplifier to said diode signal source; and means associated with said control signal amplifier for filtering out high speed signal transitions.

* * * * *